(12) United States Patent
Yu et al.

(10) Patent No.: US 9,144,127 B1
(45) Date of Patent: Sep. 22, 2015

(54) AC-POWERED LED LIGHT ENGINES, INTEGRATED CIRCUITS AND ILLUMINATING APPARATUSES HAVING THE SAME

(71) Applicant: Groups Tech Co., Ltd., Taipei (TW)

(72) Inventors: Ching Sheng Yu, New Taipei (TW);
Chih Liang Wang, Keelung (TW);
Kuang Hui Chen, New Taipei (TW)

(73) Assignee: Groups Tech Co., Ltd., Taipei (TW)

( * ) Notice: Subject to any disclaimer, the term of this patent is extended or adjusted under 35 U.S.C. 154(b) by 0 days.

(21) Appl. No.: 14/637,443

(22) Filed: Mar. 4, 2015

(30) Foreign Application Priority Data

Mar. 7, 2014 (TW) .............................. 103107793 A
Jul. 15, 2014 (TW) .............................. 103124262 A

(51) Int. Cl.
*H05B 37/02* (2006.01)
*H05B 33/08* (2006.01)

(52) U.S. Cl.
CPC ........ *H05B 33/0827* (2013.01); *H05B 33/0809* (2013.01); *H05B 33/0845* (2013.01)

(58) Field of Classification Search
CPC .... H05B 37/02; H05B 33/08; H05B 33/0824; H05B 33/083; H05B 33/0833; H05B 33/0842; H05B 33/0884; H05B 33/089
USPC ............ 315/119, 121–123, 125, 209 R, 210, 315/211, 291, 294, 295, 307, 308, 312
See application file for complete search history.

(56) References Cited

U.S. PATENT DOCUMENTS

2011/0199003 A1* 8/2011 Muguruma et al. .......... 315/122

* cited by examiner

*Primary Examiner* — Jimmy Vu

(57) ABSTRACT

Disclosed are novel AC-powered LED light engines for Solid State Lighting (SSL) able to achieve a high PF and a low THD without a traditional PFC. Getting rid of bulky, and costly magnetic components, short-life electrolytic capacitor, and EMI-causing fast switching, the disclosed AC-powered LED light engines ushers in a cost-effective, and energy-efficient LED driver design while eliminating the short-life electrolytic capacitor in an LED driver and reducing the Total Cost of Ownership (TOC). Thanks to no bulky components, the disclosed AC-powered LED light engines in a discrete or an integrated circuit form could be applied to the increasingly popular Driver-on-Board (DoB) design. Aside from being TRIAC-dimmable via legacy phase-cut dimmers, the disclosed LED light engines could also be made PWM-, analog-, or rheostat-dimmable with the incorporation of an appropriate dimming circuit to modulate the average LED current, adding more flexibility and versatility to dimming applications.

20 Claims, 7 Drawing Sheets

AC-POWERED LED LIGHT ENGINES, INTEGRATED CIRCUITS AND ILLUMINATING APPARATUSES HAVING THE SAME

CROSS-REFERENCE TO RELATED APPLICATIONS

This application claims the benefits of TW 103107793, filed Mar. 7, 2014, and TW 103124262, filed Jul. 15, 2014, both of which are fully incorporated herein by reference.

BACKGROUND OF THE INVENTION

1. Field of the Invention

The present invention relates to an AC-powered LED light engine able to gradually gear up and down the number and current of excited LED sub-arrays in accordance with the voltage level of the rectified sinusoidal input voltage, and able to smoothly dim up and down the extrinsic LED sub-arrays via a shared current sense and modulation unit while keeping the quasi-sinusoidal line current waveform in good shape as well as maintaining almost the same high Power Factor (PF) and almost the same low Total Harmonic Distortion (THD) throughout the entire dimming range.

2. Description of the Prior Art

LED-based lighting devices are gradually becoming the preferred lighting equipment because of having a longer lifetime to reduce maintenance cost, and being less likely to get damaged than legacy lighting devices.

Technically, an AC sinusoidal input voltage would normally be rectified into a rectified sinusoidal one before coming into use for the DC-driven LEDs. In the vicinity of the beginning and end of each DC pulse cycle (aka "dead time") where the input voltage is less than the combined forward voltage drop of the LEDs, the LEDs cannot be forward-biased to light up. The dead time in union with the conduction angle constitutes a full period of the rectified sinusoidal input voltage. A longer dead time translates to a smaller conduction angle, and hence a lower power factor because the line current is getting too thin to be similar in shape to the line voltage.

Traditional LED drivers would usually come along with the following application problems. The first problem would be the need for a more complicated and more expensive driving circuit consisting of an EMI filter, a bridge rectifier, a short-life Power Factor Corrector (PFC), etc. to drive LEDs. The second problem would be the flicker phenomenon due to no current flow through the LEDs during the dead time. The third problem would be a lower power factor exhibited by a low-power PFC with a loop current too weak to be precisely sensed to correctly shape the AC input current into a sinusoidal waveform. If the loop current appears too low to be precisely sensed by the current-sensing circuitry in the PFC stage, the PFC would fail to properly keep the line current in phase and in shape with the line voltage to achieve a high PF. Often mentioned in the same breath with the issue of a low PF is the issue of a high THD. The THD resulting from the discontinuous or jumping points in the AC input current waveform would have much to do with the existence of the dead time.

Besides, traditional phase-cut dimming, be it leading-edge or trailing-edge TRIAC dimming, would achieve dimming function by means of cutting off some conducting phase from the line current waveform, leading to significant deterioration of PF and THD.

SUMMARY OF THE INVENTION

The present invention is directed to an AC-powered LED light engine able to gear up and down the number and current of excited LED sub-arrays in accordance with the voltage level of the rectified sinusoidal input voltage, more particularly, to an AC-powered LED light engine with a shared current sense and modulation unit to dim up and down the extrinsic LED sub-arrays without significantly deteriorating high PF and low THD.

In one aspect, the present invention discloses novel AC-powered LED light engines able to achieve a high PF and a low THD without using a traditional PFC by taking advantage of a divide-and-conquer strategy, i.e. divide an LED array with a relatively large forward voltage drop into several LED sub-arrays with relatively small forward voltage drops for the rectified sinusoidal input voltage to get over in sequence and parallel each LED sub-array with a corresponding normally closed bypass switch commanded by a corresponding three-terminal switch controller to steer the circuit operations and shuttling between three switch states: ON, REGULATION, and OFF in accordance with a current sense signal so as to shape the line current into a quasi-sinusoidal waveform. With no need for bulky, costly, and heavy magnetic components, short-life electrolytic capacitor, and EMI-causing fast switching in the traditional PFC, the disclosed AC-powered LED light engines facilitate a cost-effective, energy-efficient, and spick-and-span LED driver design while eliminating the weakest link (short-life electrolytic capacitor) in a chain (LED driver) and reducing the Total Cost of Ownership (TOC). The disclosed AC-powered LED light engines adopt a shared current sense and modulation unit connected to and shared by the switch controllers via a resistor as well as providing an original current sense signal for the switch controllers. The first terminal and the second terminal of each switch controller compare a scaled-down or original current sense signal and an original or scaled-up reference voltage to turn a corresponding bypass switch on via the third terminal when the scaled-down or original current sense signal is below the original or scaled-up reference voltage level (below reference), turn a corresponding bypass switch on and off via the third terminal when the scaled-down or original current sense signal is at the original or scaled-up reference voltage level (at reference), and turn a corresponding bypass switch off via the third terminal when the scaled-down or original current sense signal is above the original or scaled-up reference voltage level (above reference).

In another aspect, the present invention sheds light upon the feasibility and possibility of encapsulating any type of the disclosed LED light engines into an integrated circuit to reduce apparent parts count and manufacture cost.

In still another aspect, the present invention gives examples of illuminating apparatuses based on the disclosed LED light engines. On top of being TRIAC-dimmable via legacy phase-cut dimmers, the disclosed LED light engines could also be made PWM-, analog-, or rheostat-dimmable with the incorporation of an appropriate dimming circuit to modulate the average LED current.

BRIEF DESCRIPTION OF THE DRAWINGS

The foregoing conceptions and their accompanying advantages of the present invention will get more readily appreciated after being better understood by referring to the following detailed description, in conjunction with the accompanying drawings, wherein.

DESCRIPTION OF THE PREFERRED EMBODIMENT

The detailed explanation of the present invention is described as follows. The preferred embodiments are presented for purposes of illustrations and description, and not intended to limit the spirit and scope of the present invention.

Figure 1:
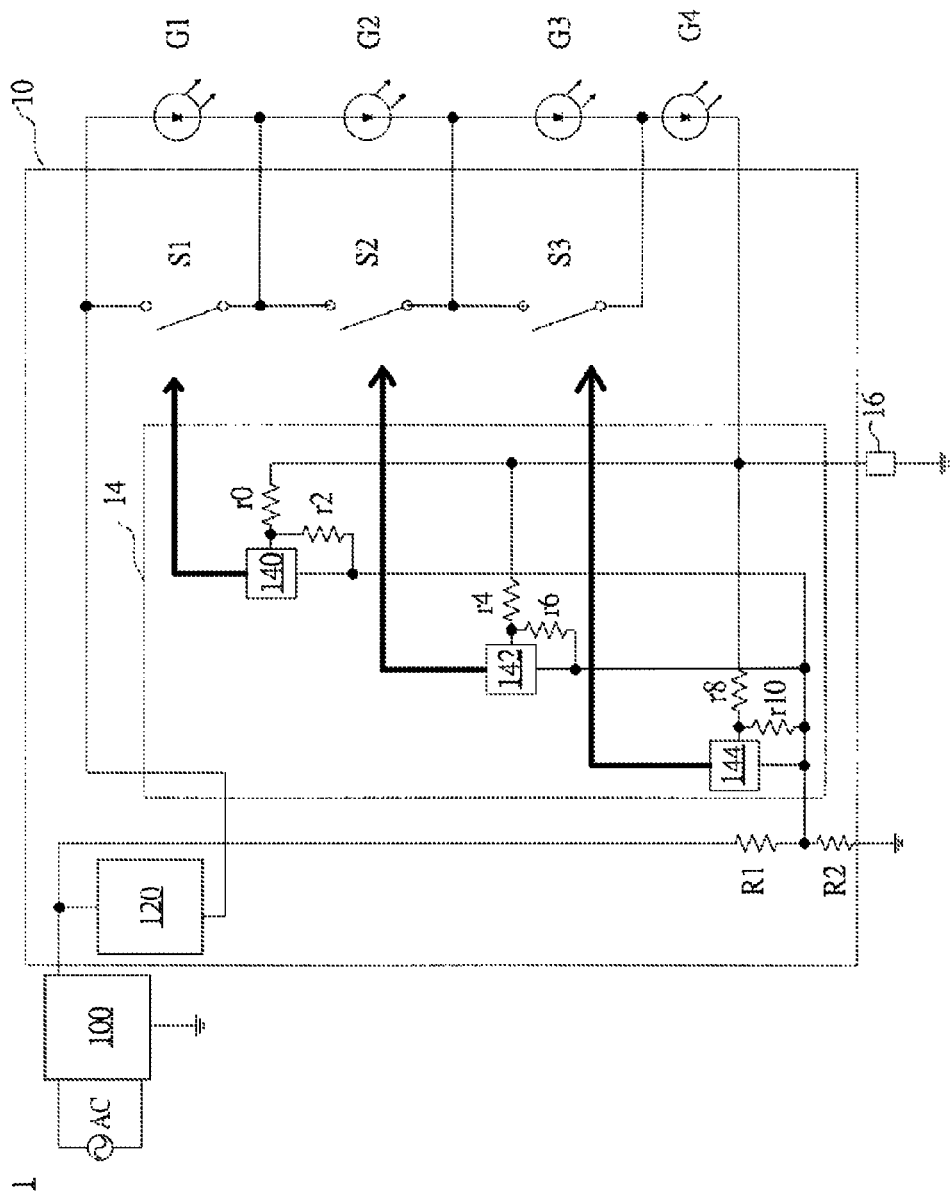
FIG. 1 illustrates a block diagram of an illuminating apparatus 1 equipped with an AC-powered LED light engine 10 in accordance with an embodiment of the present invention.

FIG. 1 illustrates a block diagram of an illuminating apparatus 1 equipped with an AC-powered LED light engine 10 designed to gear up from the bottom up and gear down from the top down the extrinsic LED sub-arrays (G1, G2, G3, and G4) in accordance with an embodiment of the present invention. The illuminating apparatus 1 comprises a rectifier 100 coupled to an AC mains, an AC-powered LED light engine 10, and a shared current sense and modulation unit 16, and is loaded up with a plurality of extrinsic LED sub-arrays (G1, G2, G3, and G4).

The AC-powered LED light engine 10 is coupled between the rectifier 100 and the extrinsic LED sub-arrays (G1, G2, G3, and G4), and has a normally closed current regulator 120 coupled to the rectifier 100 via its high-side terminal and used to regulate the highest LED current level near the rectified sinusoidal input voltage peak, a plurality of normally closed bypass switches (S1, S2, and S3) each connected in parallel with a corresponding LED sub-array except for the bottommost LED sub-array G4 and shuttling between three switch states: ON, REGULATION, and OFF according to a corresponding current sense signal, and a switch controller module 14 having a plurality of switch controllers (140, 142, and 144), each having a first terminal, a second terminal, and a third terminal, coupled between the shared current sense and modulation unit 16 via its first terminal and a corresponding bypass switch via its third terminal as a feedback network and taking control of the three switch states. A plurality of resistors r0, r4, and r8, connected between the high-side terminal of the shared current sense and modulation unit 16 and the first terminals of the switch controllers (140, 142, and 144), in pairs with a plurality of resistors r2, r6, and r10, connected between the first and the second terminals of the switch controllers (140, 142, and 144), form a bank of voltage dividers to scale down the current sense signal. In one embodiment, the configuration of the normally closed bypass switches each can also connected in parallel with a corresponding LED sub-array except for the topmost LED sub-array.

The rectifier 100 could be but will not be limited to a full-wave or a half-wave rectifier. Each of the normally closed bypass switches S1, S2, and S3 could be but will not be limited to an enhancement-mode or a depletion-mode n-channel Metal Oxide Semiconductor Field Effect Transistor (MOSFET) in collocation with an adequate switch controller. Each of the switch controllers 140, 142, and 144 could be but will not be limited to a Bipolar Junction Transistor (BJT)-based, a Shunt Regulator (SR)-based, or a Photo Coupler (PC)-based gate-driving circuitry in control of the three switch states. The switch controllers 140, 142, and 144, assumed for simplification, not for limitation, to have exactly the same reference voltage $V_{REF}$ used for comparison with scaled-down current sense signals, respectively rule over the three switch states of the normally closed bypass switches S1, S2, and S3 according to the sensed voltage across the shared current sense and modulation unit 16.

Figure 3:
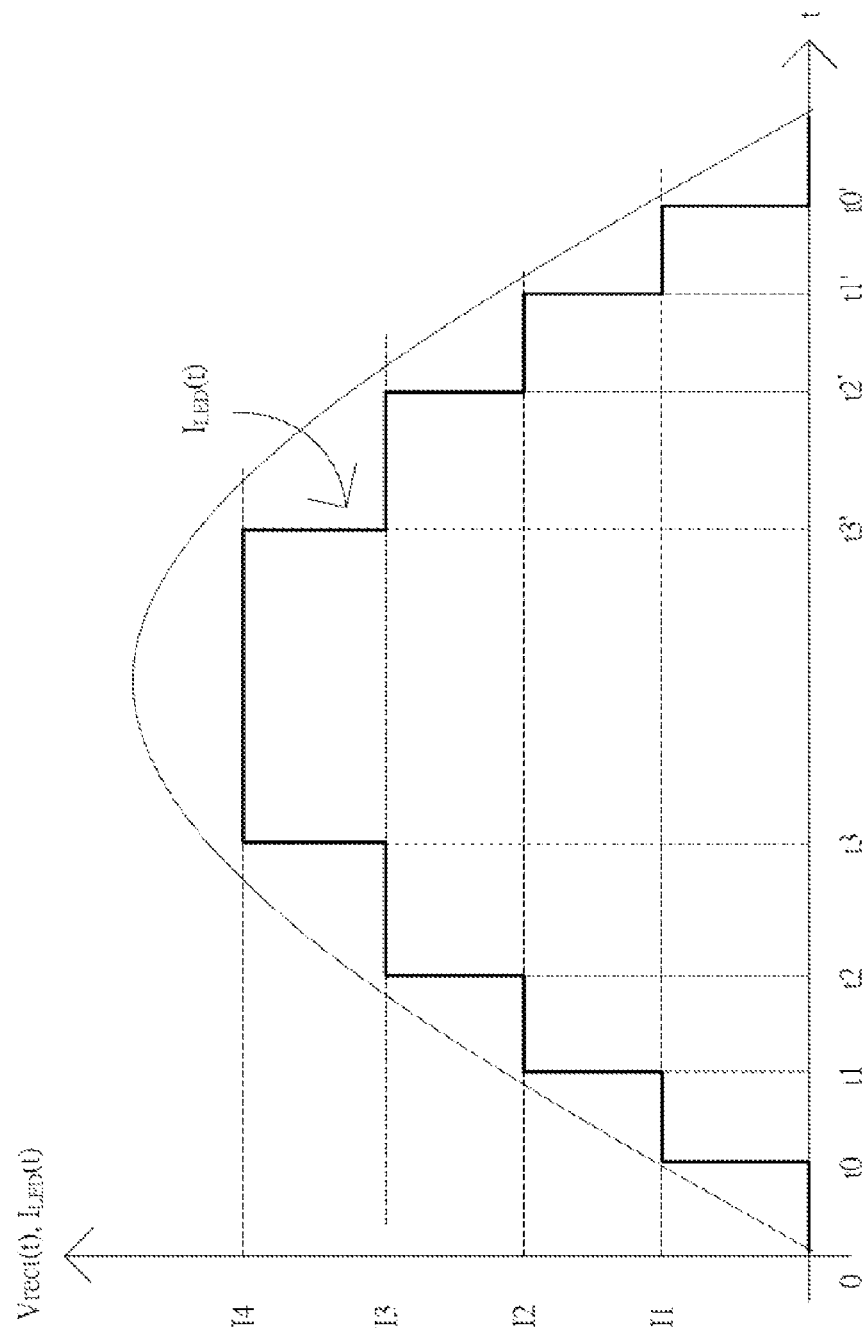
FIG. 3 illustrates two waveforms showing the shaped LED current in response to the rectified sinusoidal input voltage as the disclosed AC-powered LED light engine gears up and down the LED sub-arrays G1, G2, G3, and G4 within a period according to preferred embodiments of the present invention.

Please cross-refer to FIGS. 1 and 3. To simplify the description, the voltage divider consisting of resistors R1 and R2 in series would firstly be neglected, i.e. R1 is replaced with an open circuit having a resistance of infinity and R2 is replaced with a short circuit having a resistance of zero. During the first half of the period, the rectified sinusoidal input voltage goes up from zero to its peak. When the rising input voltage (vi) is still less than the forward voltage drop of the bottommost LED sub-array G4 ($0 \le vi < V_{G4}$), no current flows into the circuit and this interval ($0 \le t < t_0$) is commonly called the dead time. When the rising input voltage (vi) has been high enough to forward-bias the extrinsic LED sub-array G4 but is still less than the combined forward voltage drop of the extrinsic LED sub-arrays G3 and G4 ($V_{G4} \le vi < V_{G3+G4}$), a constant current I1, flowing downstream through the normally closed current regulator 120, the normally closed bypass switch S1, the normally closed bypass switch S2, the current-regulating bypass switch S3, and the current sense and modulation unit 16, lights up the extrinsic LED sub-array G4 during the interval of ($t_0 \le t < t_1$).

The constant current I1 would be regulated by the bypass switch S3 via the switch controller 144 in accordance with the design formula $$\frac{I1 \times R16 \times r10}{r8 + r10} = V_{REF},$$

i.e.

$$r10 = \frac{r8}{\frac{I1 \times R16}{V_{REF}} - 1}$$

and $$I1 = \frac{V_{REF}}{R16}\cdot\frac{1}{1 + \frac{r8}{r10}}.$$

If the constant current I1 goes above its preset current level $$\frac{V_{REF}}{R16}\frac{}{1+\frac{r8}{r10}},$$

the switch controller 144 turns off the bypass switch S3 for the constant current I1 to go down to $$\frac{\frac{V_{REF}}{R16}}{1+\frac{r8}{r10}}.$$

If the constant current I1 goes below its preset current level $$\frac{\frac{V_{REF}}{R16}}{1+\frac{r8}{r10}},$$

the switch controller 144 turns on the bypass switch S3 for the constant current I1 to go up to $$\frac{\frac{V_{REF}}{R16}}{1+\frac{r8}{r10}}.$$

That is to say, the switch controller 144 detects a scaled-down, at-reference current sense signal $$\left(\frac{I1 \times R16 \times r10}{r8+r10} = V_{REF}\right),$$

so the bypass switch S3 gets into its REGULATION state to regulate the LED current flowing through the downstream LED sub-array G4 at a constant current level I1 preset with a scaled-down resistance of the shared current sense and modulation unit 16

$$\left(\frac{R16}{1+\frac{r8}{r10}}\right),$$

wherein R16 stands for the resistance of the current sense and modulation unit 16. The switch controllers 142 and 140 each detect a scaled-down, below-reference current sense signal $$\left(\frac{I1 \times R16 \times r2}{r0+r2} < \frac{I1 \times R16 \times r6}{r4+r6} < V_{REF} = \frac{I1 \times R16 \times r10}{r8+r10}\right),$$

so the normally closed bypass switches S1 and S2 remain in their ON state to short out the extrinsic LED sub-arrays G1 and G2. Detecting a below-reference current sense signal via an unshown current-sensing resistor, the current regulator 120 stays in its ON state and acts like a normally closed switch.

When the rising input voltage (vi) has been high enough to forward-bias the combined LED sub-arrays G3 and G4 but is still less than the combined forward voltage drop of the extrinsic LED sub-arrays G2, G3, and G4 ($V_{G3+G4} \leq vi < V_{G2+G3+G4}$), a constant current I2 lights up the extrinsic LED sub-arrays G3 and G4 during the interval of ($t_1 \leq t < t_2$). The switch controller 144 detects a scaled-down, above-reference current sense signal $$\left(\frac{I2 \times R16 \times r10}{r8+r10} > V_{REF}\right),$$

so the bypass switch S3 stays in its OFF state to free up the extrinsic LED sub-array G3. The constant current I2 would be regulated by the bypass switch S2 via the switch controller 142 in accordance with the design formula $$\frac{I2 \times R16 \times r6}{r4+r6} = V_{REF},$$

i.e.

$$r6 = \frac{r4}{\frac{I2 \times R16}{V_{REF}} - 1}$$

and $$I2 = \frac{\frac{V_{REF}}{R16}}{1+\frac{r4}{r6}}.$$

That is to say, the switch controller 142 detects a scaled-down, at-reference current sense signal $$\left(\frac{I2 \times R16 \times r6}{r4+r6} = V_{REF}\right),$$

so the bypass switch S2 gets into its REGULATION state to regulate the LED current flowing through the downstream LED sub-arrays G3 and G4 at a constant current level I2 preset with a scaled-down resistance of the shared current sense and modulation unit $$16\left(\frac{R16}{1+\frac{r4}{r6}}\right).$$

The switch controller 140 detects a scaled-down, below-reference current sense signal $$\left(\frac{I2 \times R16 \times r2}{r0+r2} < V_{REF}\right),$$

so the normally closed bypass switch S1 remains in its ON state to short out the extrinsic LED sub-array G1. Detecting a below-reference current sense signal via an unshown current-sensing resistor, the current regulator 120 stays in its ON state and acts like a normally closed switch.

When the rising input voltage (vi) has been high enough to forward-bias the combined LED sub-arrays G2, G3, and G4 but is still less than the combined forward voltage drop of the extrinsic LED sub-arrays G1, G2, G3, and G4 ($V_{G2+G3+G4} \leq vi < V_{G1+G2+G3+G4}$), a constant current I3 lights up the extrinsic LED sub-arrays G2, G3, and G4 during the interval of ($t_2 \leq t < t_3$). The constant current I3 would be regulated by the bypass switch S1 via the switch controller 140 in accordance with the design formula $$\frac{I3 \times R16 \times r2}{r0 + r2} = V_{REF},$$

i.e.

$$r2 = \frac{r0}{\frac{I3 \times R16}{V_{REF}} - 1}$$

and $$I3 = \frac{V_{REF}}{R16} \cdot \frac{1}{1 + \frac{r0}{r2}}.$$

That is to say, the switch controller 140 detects a scaled-down, at-reference current sense signal $$\left(\frac{I3 \times R16 \times r2}{r0 + r2} = V_{REF}\right),$$

so the bypass switch S1 gets into its REGULATION state to regulate the LED current flowing through the downstream LED sub-arrays G2, G3, and G4 at a constant current level I3 preset with a scaled-down resistance of the shared current sense and modulation unit 16

$$\left(\frac{R16}{1 + \frac{r0}{r2}}\right).$$

The switch controllers 142 and 144 each detect a scaled-down, above-reference current sense signal $$\left(\frac{I3 \times R16 \times r10}{r8 + r10} > \frac{I3 \times R16 \times r6}{r4 + r6} > V_{REF} = \frac{I3 \times R16 \times r2}{r0 + r2}\right),$$

so the bypass switches S2 and S3 stay in their OFF state to free up the extrinsic LED sub-arrays G2 and G3. Detecting a below-reference current sense signal via an unshown current-sensing resistor, the current regulator 120 stays in its ON state and acts like a normally closed switch.

When the input voltage (vi) is high enough to forward-bias all of the extrinsic LED sub-arrays G1, G2, G3, and G4 ($V_{G1+G2+G3+G4} \leq vi$), a constant current I4 preset with an unshown current-sensing resistor in the normally closed current regulator 120 lights up all the extrinsic LED sub-arrays G1, G2, G3, and G4 in the vicinity of the peak of the rectified sinusoidal input voltage ($t_3 \leq t < t_{3'}$). The aforementioned constant current levels are ranked in the order of $$I4 > I3 = \frac{V_{REF}}{R16} \cdot \frac{1}{1 + \frac{r0}{r2}} > I2 = \frac{V_{REF}}{R16} \cdot \frac{1}{1 + \frac{r4}{r6}} > I1 = \frac{V_{REF}}{R16} \cdot \frac{1}{1 + \frac{r8}{r10}}$$

for an active current regulator or bypass switch to deactivate its downstream bypass switches, calling for the resistance sequence of r10>r6>r2, assuming the resistance equalization of r8=r4=r0. In this way, the AC-powered LED light engine 10 gears up each extrinsic LED sub-array from the bottom up.

During the second half of the period, the rectified sinusoidal input voltage goes down from its peak to zero. When the falling input voltage (vi) is still high enough to forward-bias the combined LED sub-arrays G2, G3, and G4 but has been less than the combined forward voltage drop of the extrinsic LED sub-arrays G1, G2, G3, and G4 ($V_{G2+G3+G4} \leq vi < V_{G1+G2+G3+G4}$), the switch controller 140 detects a scaled-down, at-reference current sense signal $$\left(\frac{I3 \times R16 \times r2}{r0 + r2} = V_{REF}\right),$$

so the bypass switch S1 gets into its REGULATION state to regulate the LED current flowing through the downstream LED sub-arrays G2, G3, and G4 at the preset constant current level I3 during the interval of ($t_{3'} \leq t < t_{2'}$). The switch controllers 142 and 144 each detect a scaled-down above-reference current sense signal $$\left(\frac{I3 \times R16 \times r10}{r8 + r10} > \frac{I3 \times R16 \times r6}{r4 + r6} > V_{REF} = \frac{I3 \times R16 \times r2}{r0 + r2}\right),$$

so the bypass switches S2 and S3 stay in their OFF state to free up the extrinsic LED sub-arrays G2 and G3. Detecting a below-reference current sense signal via an unshown current-sensing resistor, the current regulator 120 stays in its ON state and acts like a normally closed switch.

When the falling input voltage (vi) is still high enough to forward-bias the combined LED sub-arrays G3 and G4 but has been less than the combined forward voltage drop of the extrinsic LED sub-arrays G2, G3, and G4 ($V_{G3+G4} \leq vi < V_{G2+G3+G4}$), the switch controller 144 detects a scaled-down, above-reference current sense signal $$\left(\frac{I2 \times R16 \times r10}{r8 + r10} > V_{REF}\right),$$

so the bypass switch S3 stays in its OFF state to free up the extrinsic LED sub-array G3 during the interval of ($t_{2'} \leq t < t_{1'}$). The switch controller 142 detects a scaled-down, at-reference current sense signal $$\left(\frac{I2 \times R16 \times r6}{r4+r6} = V_{REF}\right),$$

so the bypass switch S2 gets into its REGULATION state to regulate the LED current flowing through the downstream LED sub-arrays G3 and G4 at the preset constant current level I2. The switch controller 140 detects a scaled-down, below-reference current sense signal $$\left(\frac{I2 \times R16 \times r2}{r0+r2} < V_{REF}\right),$$

so the normally closed bypass switch S1 goes back to its ON state to short out the extrinsic LED sub-array G1. Detecting a below-reference current sense signal via an unshown current-sensing resistor, the current regulator 120 stays in its ON state and acts like a normally closed switch.

When the falling input voltage (vi) is still high enough to forward-bias the extrinsic LED sub-array G4 but has been less than the combined forward voltage drop of the extrinsic LED sub-arrays G3 and G4 ($V_{G4} \leq vi < V_{G3+G4}$), the switch controller 144 detects a scaled-down, at-reference current sense signal $$\left(\frac{I1 \times R16 \times r10}{r8+r10} = V_{REF}\right),$$

so the bypass switch S3 gets into its REGULATION state to regulate the LED current flowing through the downstream LED sub-array G4 at the preset constant current level I1 during the interval of ($t_1 \leq t < t_0$). The switch controllers 140 and 142 each detect a scaled-down, below-reference current sense signal $$\left(\frac{I1 \times R16 \times r2}{r0+r2} < \frac{I1 \times R16 \times r6}{r4+r6} < V_{REF} = \frac{I1 \times R16 \times r10}{r8+r10}\right),$$

so the normally closed bypass switches S1 and S2 go back to their ON state to short out the extrinsic LED sub-arrays G1 and G2. Detecting a below-reference current sense signal via an unshown current-sensing resistor, the current regulator 120 stays in its ON state and acts like a normally closed switch. In this way, the AC-powered LED light engine 10 gears down each extrinsic LED sub-array from the top down till all of the extrinsic LED sub-arrays G1, G2, G3, and G4 go out. The number of the aforementioned constant current levels for the AC-powered LED light engine 10, translating to the number of the bypass switches and the switch controllers devised to draw a quasi-sinusoidal line current waveform from the AC sinusoidal line voltage source, could be arbitrarily chosen with a design tradeoff between performance and cost.

Figure 2:
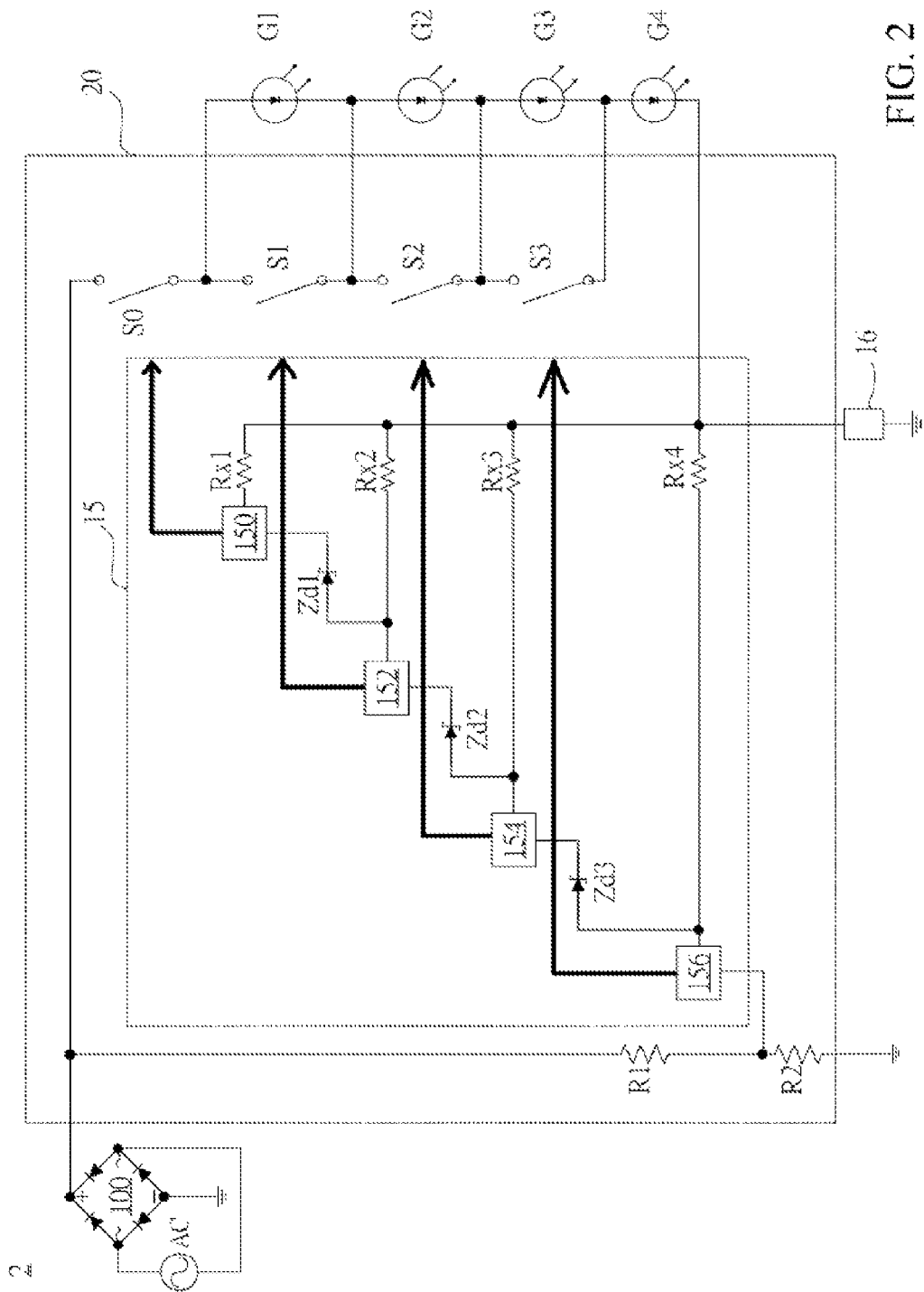
FIG. 2 illustrates a block diagram of an illuminating apparatus 2 equipped with an AC-powered LED light engine 20 in accordance with another embodiment of the present invention.

FIG. 2 illustrates a block diagram of an illuminating apparatus 2 equipped with an AC-powered LED light engine 20 designed to gear up from the bottom up and gear down from the top down the extrinsic LED sub-arrays (G1, G2, G3, and G4) in accordance with an embodiment of the present invention. The illuminating apparatus 2 comprises a rectifier 100 coupled to an AC mains, an AC-powered LED light engine 20, and a shared current sense and modulation unit 16, and is loaded up with a plurality of extrinsic LED sub-arrays (G1, G2, G3, and G4).

The AC-powered LED light engine 20 is coupled between the rectifier 100 and the extrinsic LED sub-arrays (G1, G2, G3, and G4), and has a normally closed current regulator (such as the current-regulating switch S0) coupled to the rectifier 100 via its high-side terminal and used to regulate the highest LED current level near the rectified sinusoidal input voltage peak, a plurality of normally closed bypass switches (S1, S2, and S3) each connected in parallel with a corresponding LED sub-array except for the bottommost LED sub-array G4 and shuttling between the three switch states according to a corresponding current sense signal, and a switch controller module 15 having a plurality of switch controllers (150, 152, 154, and 156) each coupled between the shared current sense and modulation unit 16 and a corresponding current-regulating switch or bypass switch as a feedback network and taking control of the three switch states. A plurality of anti-clamping resistors Rx1, Rx2, and Rx3, connected between the high-side terminal of the shared current sense and modulation unit 16 and the first terminals of the switch controllers (140, 142, and 144), would prevent the terminal voltage across the shared current sense and modulation unit 16 from being clamped at lower reference voltage levels so as not to miss out on higher current regulation levels.

The normally closed bypass switches S1, S2, and S3 as well as the switch controllers 150, 152, 154, and 156 in FIG. 2 could be identical to those in FIG. 1. The switch controllers 150, 152, 154, and 156, respectively ruling over the three switch states of the current-regulating switch S0 as well as the normally closed bypass switches S1, S2, and S3 in accordance with the sensed voltage across the shared current sense and modulation unit 16, are assumed for simplification, not for limitation, to have exactly the same reference voltage $V_{REF}$. The scaled-up reference voltages actually used for comparison with current sense signals are set up by means of connecting the first terminal of a lower switch controller to the second terminal of an upper switch controller via an optional Zener diode (Zd1, Zd2, and Zd3) to make non-integer multiples possible, and could be ranked in the following order: $V_{150A,REF} = 4V_{REF} + V_{Zd1} + V_{Zd3} > V_{152A,REF} = 3V_{REF} + V_{Zd2} + V_{Zd3} > V_{154A,REF} = 2V_{REF} + V_{Zd3} > V_{156A,REF} = V_{REF}$, wherein $V_{Zd1}$, $V_{Zd2}$, and $V_{Zd3}$ are breakdown voltages of the optional Zener diodes Zd1, Zd2, and Zd3.

Please cross-refer to FIGS. 2 and 3. During the first half of the period, the rectified sinusoidal input voltage goes up from zero to its peak. When the rising input voltage (vi) is still less than the forward voltage drop of the bottommost LED sub-array G4 ($0 \leq vi < V_{G4}$), no current flows into the circuit and this interval ($0 \leq t < t_0$) is referred to as the dead time. When the rising input voltage (vi) has been high enough to forward-bias the extrinsic LED sub-array G4 but is still less than the combined forward voltage drop of the extrinsic LED sub-arrays G3 and G4 ($V_{G4} \leq vi < V_{G3+G4}$), a constant current I1 lights up the extrinsic LED sub-array G4 during the interval of ($t_0 \leq t < t_1$).

The constant current I1 would be regulated by the bypass switch S3 via the switch controller 156 in accordance with the design formula $$I1 \times R16 = V_{REF}, \text{ i.e. } I1 = \frac{V_{REF}}{R16}.$$

That is to say, the switch controller 156 detects an at-reference current sense signal ($I1 \times R16 = V_{REF}$), so the bypass switch S3 gets into its REGULATION state to regulate the LED current flowing through the downstream LED sub-array G4 at a constant current level I1 preset with the resistance R16 of the shared current sense and modulation unit $$\left(I1 = \frac{V_{REF}}{R16}\right).$$

The switch controllers 154, 152, and 150 each detect a below-reference current sense signal (I1×R16=$V_{REF}$<$2V_{REF}$+$V_{Zd3}$<$3V_{REF}$+$V_{Zd2}$+$V_{Zd3}$<$4V_{REF}$+$V_{Zd1}$+$V_{Zd2}$+$V_{Zd3}$), so the current-regulating switch S0 as well as the normally closed bypass switches S1 and S2 remain in their ON state to short out the extrinsic LED sub-arrays G1 and G2.

When the rising input voltage (vi) has been high enough to forward-bias the combined LED sub-arrays G3 and G4 but is still less than the combined forward voltage drop of the extrinsic LED sub-arrays G2, G3, and G4 ($V_{G3+G4}$≤vi<$V_{G2+G3+G4}$), a constant current I2 lights up the extrinsic LED sub-arrays G3 and G4 during the interval of ($t_1$≤t<$t_2$). The switch controller 156 detects an above-reference current sense signal (I2×R16>$V_{REF}$), so the bypass switch S3 stays in its OFF state to free up the extrinsic LED sub-array G3. The constant current I2 would be regulated by the bypass switch S2 via the switch controller 154 in accordance with the design formula I2×R16=$2V_{REF}$+$V_{Zd3}$, i.e.

$$I2 = \frac{2V_{REF} + V_{Zd3}}{R16}.$$

That is to say, the switch controller 154 detects an at-reference current sense signal (I2×R16=$2V_{REF}$+$V_{Zd3}$), so the bypass switch S2 gets into its REGULATION state to regulate the LED current flowing through the downstream LED sub-arrays G3 and G4 at a constant current level I2 preset with two times the reference voltage $2V_{REF}$ plus the optional $$V_{Zd3}\left(I2 = \frac{2V_{REF} + V_{Zd3}}{R16}\right).$$

The switch controllers 150 and 152 each detect a below-reference current sense signal (I2×R16=$2V_{REF}$+$V_{Zd3}$<$3V_{REF}$+$V_{Zd2}$+$V_{Zd3}$<$4V_{REF}$+$V_{Zd1}$+$V_{Zd2}$+$V_{Zd3}$), so the current-regulating switch S0 and the normally closed bypass switch S1 remain in their ON state to short out the extrinsic LED sub-array G1.

When the rising input voltage (vi) has been high enough to forward-bias the combined LED sub-arrays G2, G3, and G4 but is still less than the combined forward voltage drop of the extrinsic LED sub-arrays G1, G2, G3, and G4 ($V_{G2+G3+G4}$≤vi<$V_{G1+G2+G3+G4}$), a constant current I3 lights up the extrinsic LED sub-arrays G2, G3, and G4 during the interval of ($t_2$≤t<$t_3$). The constant current I3 would be regulated by the bypass switch S1 via the switch controller 152 in accordance with the design formula I3×R16=$3V_{REF}$+$V_{Zd2}$+$V_{Zd3}$, i.e.

$$I3 = \frac{3V_{REF} + V_{Zd2} + V_{Zd3}}{R16}.$$

That is to say, the switch controller 152 detects an at-reference current sense signal (I3×R16=$3V_{REF}$+$V_{Zd2}$+$V_{Zd3}$), so the bypass switch S1 gets into its REGULATION state to regulate the LED current flowing through the downstream LED sub-arrays G2, G3, and G4 at a constant current level I3 preset with three times the reference voltage $3V_{REF}$ plus the optional $V_{Zd2}$ and $$V_{Zd3}\left(I3 = \frac{3V_{REF} + V_{Zd2} + V_{Zd3}}{R16}\right).$$

The switch controllers 156 and 154 each detect an above-reference current sense signal (I3×R16=$3V_{REF}$+$V_{Zd2}$+$V_{Zd3}$>$2V_{REF}$+$V_{Zd3}$>$V_{REF}$), so the bypass switches S2 and S3 stay in their OFF state to free up the extrinsic LED sub-arrays G2 and G3. The switch controller 150 detects a below-reference current sense signal (I3×R16=$3V_{REF}$+$V_{Zd2}$+$V_{Zd3}$<$4V_{REF}$+$V_{Zd1}$+$V_{Zd2}$+$V_{Zd3}$), so the current-regulating switch S0 stays in its ON state and acts like a normally closed switch.

When the input voltage (vi) is high enough to forward-bias all of the extrinsic LED sub-arrays G1, G2, G3, and G4 ($V_{G1+G2+G3+G4}$≤vi), a constant current I4 lights up all the extrinsic LED sub-arrays G1, G2, G3, and G4 during the interval of ($t_3$≤t<$t_{3'}$). The constant current I4 would be regulated by the current-regulating switch S0 via the switch controller 150 in accordance with the design formula I4×R16=$4V_{REF}$+$V_{Zd1}$+$V_{Zd2}$+$V_{Zd3}$, i.e.

$$I4 = \frac{4V_{REF} + V_{Zd1} + V_{Zd2} + V_{Zd3}}{R16}.$$

That is to say, the switch controller 150 detects an at-reference current sense signal (I4×R16=$4V_{REF}$+$V_{Zd1}$+$V_{Zd2}$+$V_{Zd3}$), so the current-regulating switch S0 gets into its REGULATION state to regulate the LED current flowing through the downstream LED sub-arrays G1, G2, G3, and G4 at a constant current level I4 preset with four times the reference voltage $4V_{REF}$ plus the optional and $V_{Zd1}$, $V_{Zd2}$, and $V_{Zd3}$ $$\left(I4 = \frac{4V_{REF} + V_{Zd1} + V_{Zd2} + V_{Zd3}}{R16}\right).$$

The switch controllers 152, 154, and 156 each detect an above-reference current sense signal (I4×R16=$4V_{REF}$+$V_{Zd1}$+$V_{Zd2}$+$V_{Zd3}$>$3V_{REF}$+$V_{Zd2}$+$V_{Zd3}$>$2V_{REF}$+$V_{Zd3}$>$V_{REF}$), so the bypass switches S1, S2, and S3 stay in their OFF state to free up the extrinsic LED sub-arrays G1, G2, and G3. In this way, the AC-powered LED light engine 20 gears up each extrinsic LED sub-array from the bottom up.

During the second half of the period, the rectified sinusoidal input voltage goes down from its peak to zero. When the falling input voltage (vi) is still high enough to forward-bias the combined LED sub-arrays G2, G3, and G4 but has been less than the combined forward voltage drop of the extrinsic LED sub-arrays G1, G2, G3, and G4 ($V_{G2+G3+G4}$≤vi<$V_{G1+G2+G3+G4}$), the switch controller 152 detects an at-reference current sense signal (I3×R16=$3V_{REF}$+$V_{Zd2}$+$V_{Zd3}$), so the bypass switch S1 gets into its REGULATION state to regulate the LED current flowing through the downstream LED sub-arrays G2, G3, and G4 at the preset constant current level I3 during the interval of ($t_{3'}$≤t<$t_{2'}$). The switch controllers 154 and 156 each detect an above-reference current sense signal (I3×R16=$3V_{REF}$+$V_{Zd2}$+$V_{Zd3}$>$2V_{REF}$+$V_{Zd3}$>$V_{REF}$), so the bypass switches S2 and S3 stay in their OFF state to free up the extrinsic LED sub-arrays G2 and G3. The switch controller 150 detects a below-reference current sense signal (I3×R16=3$V_{REF}$+$V_{Zd2}$+$V_{Zd3}$<4$V_{REF}$+$V_{Zd1}$+$V_{Zd2}$+$V_{Zd3}$), so the current-regulating switch S0 stays in its ON state and acts like a normally closed switch.

When the falling input voltage (vi) is still high enough to forward-bias the combined LED sub-arrays G3 and G4 but has been less than the combined forward voltage drop of the extrinsic LED sub-arrays G2, G3, and G4 ($V_{G3+G4}$≤vi<$V_{G2+G3+G4}$), the switch controller 156 detects an above-reference current sense signal (I2×R16>$V_{REF}$), so the bypass switch S3 stays in its OFF state to free up the LED sub-array G3 during the interval of ($t_{2'}$≤t<$t_{1'}$). The switch controller 154 detects an at-reference current sense signal (I2×R16=2$V_{REF}$+$V_{Zd3}$), so the bypass switch S2 gets into its REGULATION state to regulate the LED current flowing through the downstream LED sub-arrays G3 and G4 at the preset constant current level I2. The switch controllers 150 and 152 each detect a below-reference current sense signal (I2×R16=2$V_{REF}$+$V_{Zd3}$<3$V_{REF}$+$V_{Zd2}$+$V_{Zd3}$<4$V_{REF}$+$V_{Zd1}$+$V_{Zd2}$+$V_{Zd3}$), so the current-regulating switch S0 remains in its ON state, and the normally closed bypass switch S1 goes back to their ON state to short out the extrinsic LED sub-array G1.

When the falling input voltage (vi) is still high enough to forward-bias the LED sub-array G4 but has been less than the combined forward voltage drop of the extrinsic LED sub-arrays G3 and G4 ($V_{G4}$≤vi<$V_{G3+G4}$), the switch controller 156 detects an at-reference current sense signal (I1×R16=$V_{REF}$), so the bypass switch S3 gets into its REGULATION state to regulate the LED current flowing through the downstream LED sub-array G4 at the preset constant current level I1 during the interval of ($t_{1'}$≤t<$t_{0'}$). The switch controllers 150, 152, and 154 each detect a below-reference current sense signal (I1×R16=$V_{REF}$<2$V_{REF}$+$V_{Zd3}$<3$V_{REF}$+$V_{Zd2}$+$V_{Zd3}$<4$V_{REF}$+$V_{Zd1}$+$V_{Zd2}$+$V_{Zd3}$), so the current-regulating switch S0 remains in its ON state, and the normally closed bypass switches S1 and S2 go back to their ON state to short out the extrinsic LED sub-arrays G1 and G2.

In this way, the AC-powered LED light engine 20 gears down each extrinsic LED sub-array from the top down till all of the extrinsic LED sub-arrays G1, G2, G3, and G4 go out. The number of the aforementioned constant current levels for the AC-powered LED light engine 20, translating to the number of the bypass switches and the switch controllers devised to draw a quasi-sinusoidal line current waveform from the AC sinusoidal line voltage source, could be arbitrarily chosen with a design tradeoff between performance and cost. It is worth mentioning that the AC-powered LED light engines 10 and 20 could proportionally dim up and down each extrinsic LED sub-array by means of varying the resistance R16 (unshown) of the shared current sense and modulation unit 16, keeping the quasi-sinusoidal line current waveform in good shape as well as maintaining almost the same high Power Factor (PF) and almost the same low Total Harmonic Distortion (THD) throughout the entire dimming range.

In this embodiment, the current-regulating switch S0 controlled by the switch controller 150 can be replaced by the current regulator 120 shown in FIG. 1. Similarly, the current-regulating switch S0 controlled by the switch controller 150 can replace the current regulator 120 employed in other embodiments. The major difference between the current-regulating switch S0 and the current regulator 120 would be: the highest current level I4 regulated by the current-regulating switch S0, acting in concert with other bypass switches S1, S2, and S3, would be in proportion to the lower current levels I3, I2, and I1, while the highest current level I4 regulated by the current regulator 120, standing alone for current regulation, would be out of proportion to the lower current levels I3, I2, and I1.

Figure 4:
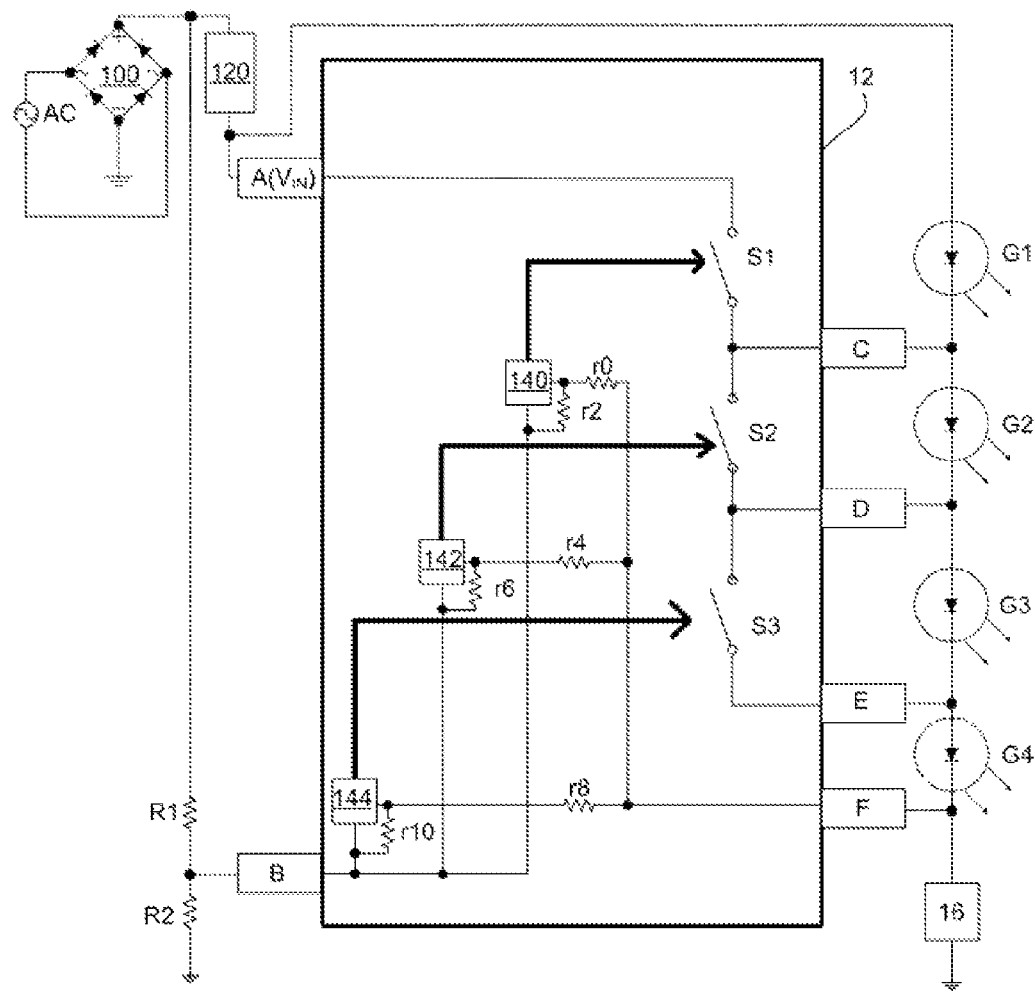
FIG. 4 illustrates a schematic diagram of an integrated circuit having the AC-powered LED light engine 10 shown in FIG. 1 according to an embodiment of the present invention.

FIG. 4 illustrates an integrated circuit having the AC-powered LED light engine 10 shown in FIG. 1 in accordance with an embodiment of the present invention. As is shown in FIG. 4, the integrated circuit 12 has six pins A, B, C, D, E, and F, three bypass switches S1, S2, and S3, as well as three switch controllers 140, 142, and 144. The shared current sense and modulation unit 16 is placed outside the integrated circuit 12 to make the current levels programmable to circuit designers of the illuminating apparatus.

The integrated circuit 12 has its pin A coupled to the low-side terminal of the current regulator 120, the anode of the LED sub-array G1, and the third terminal of the bypass switch S1, its pin B coupled to the output terminal of the voltage divider (the node between the resistors R1 and R2), the low-side terminals of the resistors r2, r6, and r10, as well as the second terminals of the switch controllers 140, 142, and 144, its pin C coupled to the second terminal of the bypass switch S1, the cathode of the LED sub-array G1, and the anode of the LED sub-array G2, its pin D coupled to the second terminal of the bypass switch S2, the third terminal of the bypass switch S3, the cathode of the LED sub-array G2, and the anode of the LED sub-array G3, its pin E coupled to the second terminal of the bypass switch S3, the cathode of the LED sub-array G3, and the anode of the LED sub-array G4, and its pin F coupled to the high-side terminals of the resistors r0, r4, and r8, the high-side terminal of the shared current sense and modulation unit 16, and the cathode of the LED sub-array G4.

In this embodiment, the integrated circuit 12 encapsulates the AC-powered LED light engine 10 shown in FIG. 1. It goes without saying any type of the AC-powered LED light engines based on the spirit and scope of the present invention can be encapsulated in the form of an integrated circuit to reduce the apparent parts count and enable a more compact circuit design. Moreover, a plurality of resulting integrated circuits of the same type could be connected in series to extend the voltage rating or in parallel to extend the current rating, depending on practical requirements for given applications.

Figure 5:
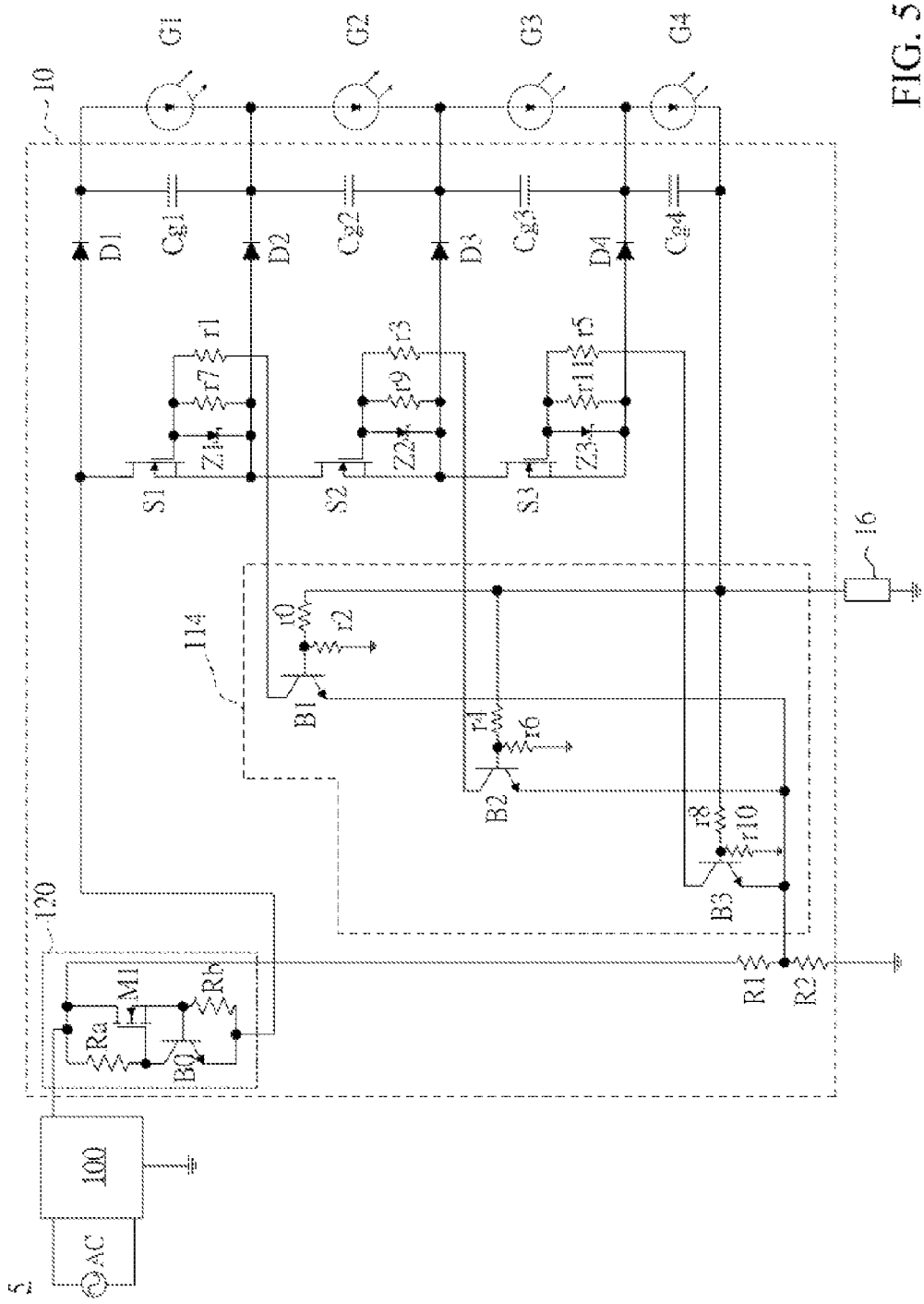
FIG. 5 gives an example of the illuminating apparatus 1 equipped with the AC-powered LED light engine 10 shown in FIG. 1.

FIG. 5 gives an example of an illuminating apparatus 5 equipped with the an AC-powered LED light engine 10 shown in FIG. 1, wherein the AC-powered LED light engine 10 is coupled between the rectifier 100 and the extrinsic LED sub-arrays (G1, G2, G3, and G4).

The illuminating apparatus 5 comprises a rectifier 100 coupled to an AC mains, an AC-powered LED light engine 10, a plurality of extrinsic LED sub-arrays (G1, G2, G3, and G4), and a shared current sense and modulation unit 16. The AC-powered LED light engine 10 comprises a normally closed current regulator 120, a plurality of normally closed bypass switches (S1, S2, and S3) each connected in parallel with a corresponding LED sub-array except for the bottommost LED sub-array G4 and shuttling between the three switch states according to a corresponding current sense signal, and a switch controller module 114 having a plurality of switch controllers B1, B2, and B3 each coupled between the shared current sense and modulation unit 16 and a corresponding bypass switch as a feedback network and taking control of the three switch states. Each of the normally closed bypass switches S1, S2, and S3 is a depletion-mode n-channel MOSFET in collocation with an adequate switch controller. Each of the switch controllers is a BJT-based gate-driving circuit, comprising a corresponding gate-discharging resistor (r7, r9, and r11) for turning on a corresponding bypass switch (S1, S2, and S3) as well as a corresponding voltage-comparing BJT (B1, B2, and B3), a corresponding voltage-dividing resistor pair (r0 and r2, r4 and r6, as well as r8 and r10), a corresponding voltage-dividing resistor (r1, r3, and r5), and a corresponding voltage-clamping Zener diode (Z1, Z2, and Z3) for turning off a corresponding bypass switch (S1, S2, and S3), in control of the three switch states.

In FIG. 5, the first part of the voltage-dividing resistor pair (r0, r4, and r8) is connected between the high-side terminal of the shared current sense and modulation unit 16 and the bases of the voltage-comparing BJTs (B1, B2, and B3), while the second part of the voltage-dividing resistor pair (r2, r6, and r10) could be either connected between the bases of the voltage-comparing BJTs (B1, B2, and B3) and ground or between the bases and the emitters of the voltage-comparing BJTs (B1, B2, and B3), as is shown in FIG. 1.

In this embodiment, the normally closed current regulator 120 comprises a current-regulating switch M1 (an enhancement-mode n-channel MOSFET), a gate-charging resistor Ra, a voltage-comparing BJT B0, and a current-sensing resistor Rb. The current-regulating switch M1 has its drain coupled to the rectifier 100 (the high-side terminal of the gate-charging resistor Ra), its gate coupled to the low-side terminal of the gate-charging resistor Ra (the collector of the voltage-comparing BJT B0), and its source coupled to the high-side terminal of the current-sensing resistor Rb (the base of the voltage-comparing BJT B0).

It is crystal clear that a depletion-mode n-channel MOSFET is essentially a normally closed switch. Only the current-regulating switch M1 needs to get initialized as a normally closed switch after the random power-on of the illuminating apparatus 5. More specifically, in the initial state, M1's intrinsic gate-source capacitor could rapidly be charged up to above its threshold voltage level via a corresponding gate-charging resistor Ra so as to make its channel normally closed once the rectified sinusoidal input voltage could forward-bias the bottommost LED sub-array G4.

Based on the comparison between an applied gate-source voltage $V_{GS}$ and a negative threshold voltage $V_{th}$, a depletion-mode n-channel MOSFET would operate in its ON state ($V_{GS} > V_{th}$) due to discharging of its intrinsic gate-source capacitor via a corresponding gate-discharging resistor when a corresponding below-reference current sense signal turns a corresponding voltage-comparing BJT off, in its REGULATION state ($V_{GS} = V_{th}$) due to discharging and charging of its intrinsic gate-source capacitor via a corresponding gate-discharging resistor as well as a corresponding voltage-comparing BJT, a corresponding voltage-dividing resistor, and a corresponding voltage-clamping Zener diode when a corresponding at-reference current sense signal turns a corresponding voltage-comparing BJT off and on, or in its OFF state ($V_{GS} < V_{th}$) due to charging of its intrinsic gate-source capacitor via a corresponding voltage-comparing BJT, a corresponding voltage-dividing resistor, and a corresponding voltage-clamping Zener diode when a corresponding above-reference current sense signal turns a corresponding voltage-comparing BJT on. As such, all of the normally closed bypass switches S1, S2, and S3 would shuttle between the three switch states except for the normally closed current-regulating switch M1 excluding its OFF state from the three switch states.

A voltage divider, comprising resistors R1 and R2 in series, adds a scaled-down sample of the rectified sinusoidal input voltage $$\left(\frac{v_i \times R2}{R1 + R2}\right)$$

to the emitters of the voltage-comparing BJTs B1, B2, and B3 so that scaled-down current sense signals would be compared with a sinusoidal-modulated reference voltage $$V_{REF} + \frac{v_i \times R2}{R1 + R2}$$

rather than a fixed reference voltage $V_{REF}$ to further smooth a stepping current waveform into a more sinusoidal one for getting an even higher PF and an even lower THD. In this embodiment, a flicker-suppressing capacitor (Cg1, Cg2, Cg3, and Cg4), coupled in parallel with a corresponding LED sub-array and functioning as an auxiliary supply of LED current, and a corresponding charge-retaining diode (D1, D2, D3, and D4), coupled between a corresponding normally closed bypass switch and a corresponding flicker-suppressing capacitor to prevent capacitor charge from being consumed by other unintended circuit components instead of a corresponding LED sub-array, are also incorporated to improve the flicker issue without any detriment to the high PF and low THD because each flicker-suppressing capacitor is merely charged up to a corresponding LED sub-array forward voltage drop and would not set up an even higher voltage barrier for the rectified sinusoidal input voltage to get over. The aforementioned flicker-suppressing capacitors, applicable to any embodiment of the present invention, could be implemented with short-life electrolytic capacitors or, even better, an equivalent M×N matrix of non-electrolytic capacitors, such as ceramic capacitors, tantalum capacitors, or solid-state capacitors for a much longer lifespan, where the rows number M and the columns number N are associated with the voltage rating and the current rating, respectively.

Figure 6:
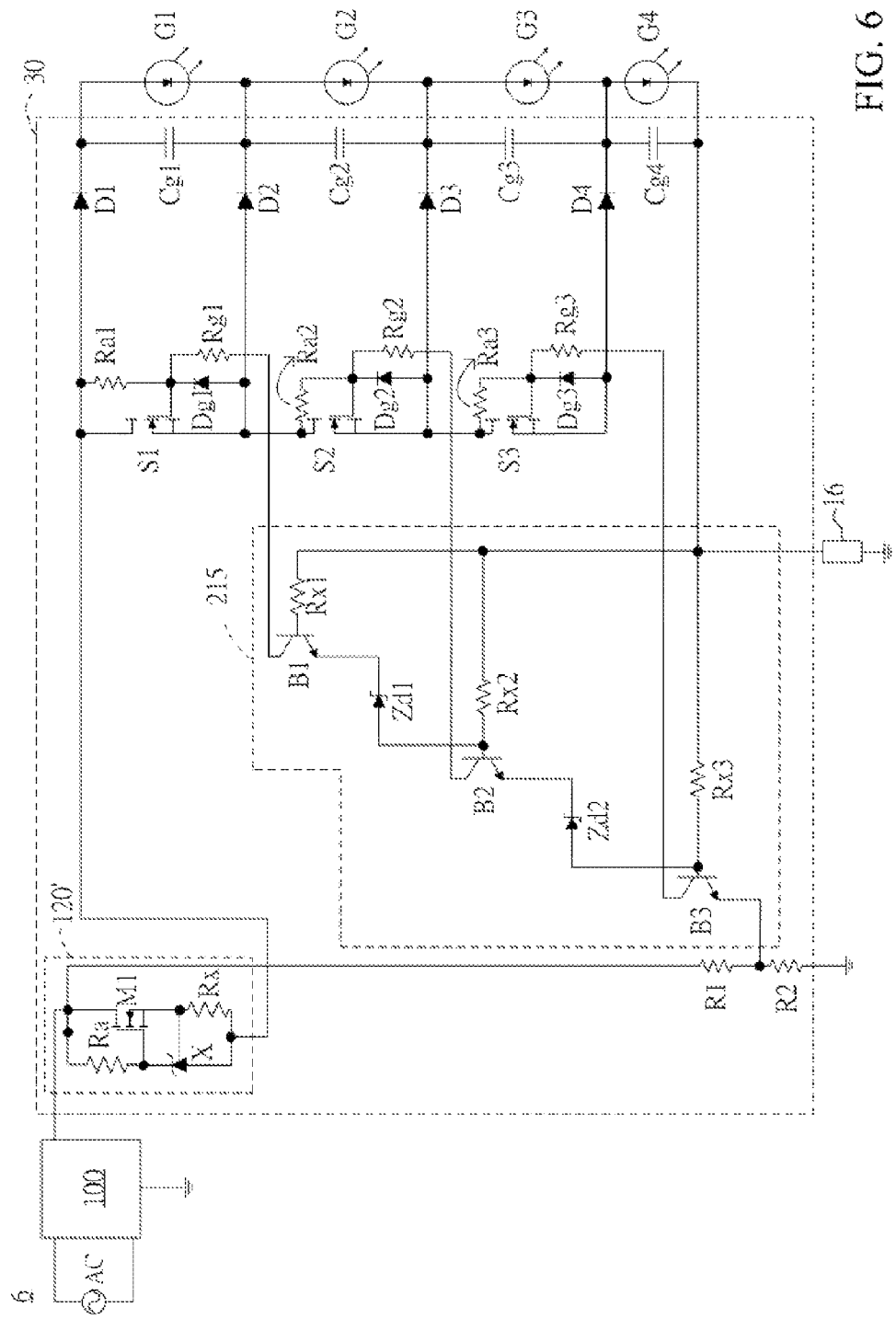
FIG. 6 gives an example of an illuminating apparatus 6 equipped with an AC-powered LED light engine 30 in accordance with preferred embodiments of the present invention.

FIG. 6 illustrates a schematic diagram of an illuminating apparatus 6 equipped with the AC-powered LED light engine 30. The illuminating apparatus 6 comprises a rectifier 100 coupled to an AC mains, an AC-powered LED light engine 30, a string of extrinsic LED sub-arrays (G1, G2, G3, and G4), as well as a shared current sense and modulation unit 16 for providing current sense signals. The AC-powered LED light engine 30 comprises a normally closed current regulator 120', a string of normally closed bypass switches (S1, S2, and S3) each connected in parallel with a corresponding LED sub-array except for the bottommost LED sub-array G4 and shuttling between the three switch states according to a corresponding current sense signal, and a switch controller module 215 having a plurality of switch controllers (B1, B2, and B3) each coupled between the shared current sense and modulation unit 16 and a corresponding bypass switch as a feedback network and taking control of the three switch states.

Each of the normally closed bypass switches S1, S2, and S3 is an enhancement-mode n-channel MOSFET in collocation with an adequate switch controller. The gate-charging resistors (Ra, Ra1, Ra2, and Ra3) are used to charge the intrinsic gate-source capacitors of the current regulator 120 as well as the bypass switches S1, S2, and S3 up to above their threshold voltage so as to initialize them as normally closed switches after the random power-on of the illuminating apparatus 6. Understandable from that of FIG. 5, the initialization process of FIG. 5 would not be repeated herein. Each of the switch controllers is a BJT-based gate-driving circuit, comprising a corresponding gate-charging resistor (Ra1, Ra2, and Ra3) for turning on a corresponding bypass switch (S1, S2, and S3) as well as a corresponding voltage-comparing device (BJTs B1, B2, and B3 in conjunction with optional Zener diodes Zd1 and Zd2), a corresponding anti-clamping resistor (Rx1, Rx2, and Rx3), a corresponding current-limiting resistor (Rg1, Rg2, and Rg3), and a corresponding gate-discharging diode (Dg1, Dg2, and Dg3) for turning off a corresponding bypass switch (S1, S2, and S3), in control of the three switch states. In this embodiment, the normally closed current regulator 120' comprises a current-regulating switch M1 (an enhancement-mode n-channel MOSFET), a gate-charging resistor Ra, a shunt regulator X, and a current-sensing resistor Rx. Obviously, a BJT B0 and a shunt regulator X both used for voltage comparison in the present invention are interchangeable.

Based on the comparison between an applied gate-source voltage $V_{GS}$ and a positive threshold voltage $V_{th}$, an enhancement-mode n-channel MOSFET would operate in its ON state ($V_{GS}>V_{th}$) due to charging of its intrinsic gate-source capacitor via a corresponding gate-charging resistor when a corresponding below-reference current sense signal turns a corresponding voltage-comparing BJT off, in its REGULATION state ($V_{GS}=V_{th}$) due to charging and discharging of its intrinsic gate-source capacitor via a corresponding gate-charging resistor as well as a corresponding voltage-comparing device, a corresponding anti-clamping resistor, a corresponding current-limiting resistor, and a corresponding gate-discharging diode when a corresponding at-reference current sense signal turns a corresponding voltage-comparing BJT off and on, or in its OFF state ($V_{GS}<V_{th}$) due to discharging of its intrinsic gate-source capacitor via a corresponding voltage-comparing device, a corresponding anti-clamping resistor, a corresponding current-limiting resistor, and a corresponding gate-discharging diode when a corresponding above-reference current sense signal turns a corresponding voltage-comparing BJT on. As such, all of the normally closed bypass switches S1, S2, and S3 would shuttle between the three switch states except for the normally closed current-regulating switch M1 excluding its OFF state from the three switch states.

A voltage divider, comprising resistors R1 and R2 in series, adds a scaled-down sample of the rectified sinusoidal input voltage $$\left(\frac{v_i \times R2}{R1 + R2}\right)$$

to the emitter of the bottommost voltage-comparing BJT B3 so that current sense signals would be compared with a sinusoidal-modulated reference voltage $$\left(V_{REF} + \frac{v_i \times R2}{R1 + R2}, 2V_{REF} + V_{Zd2} + \frac{v_i \times R2}{R1 + R2},\right.$$

and $$\left.3V_{REF} + V_{Zd1} + V_{Zd2} + \frac{v_i \times R2}{R1 + R2}\right)$$

rather than a fixed reference voltage ($V_{REF}$, $2V_{REF}+V_{Zd2}$, and $3V_{REF}+V_{Zd1}+V_{Zd2}$) to further smooth a stepping current waveform into a more sinusoidal one for getting an even higher PF and an even lower THD. The flicker-suppressing capacitor (Cg1, Cg2, Cg3, and Cg4) and the corresponding charge-retaining diode (D1, D2, D3, and D4) are the same as those in FIG. 5, and therefore do not need any elaboration.

Figure 7:
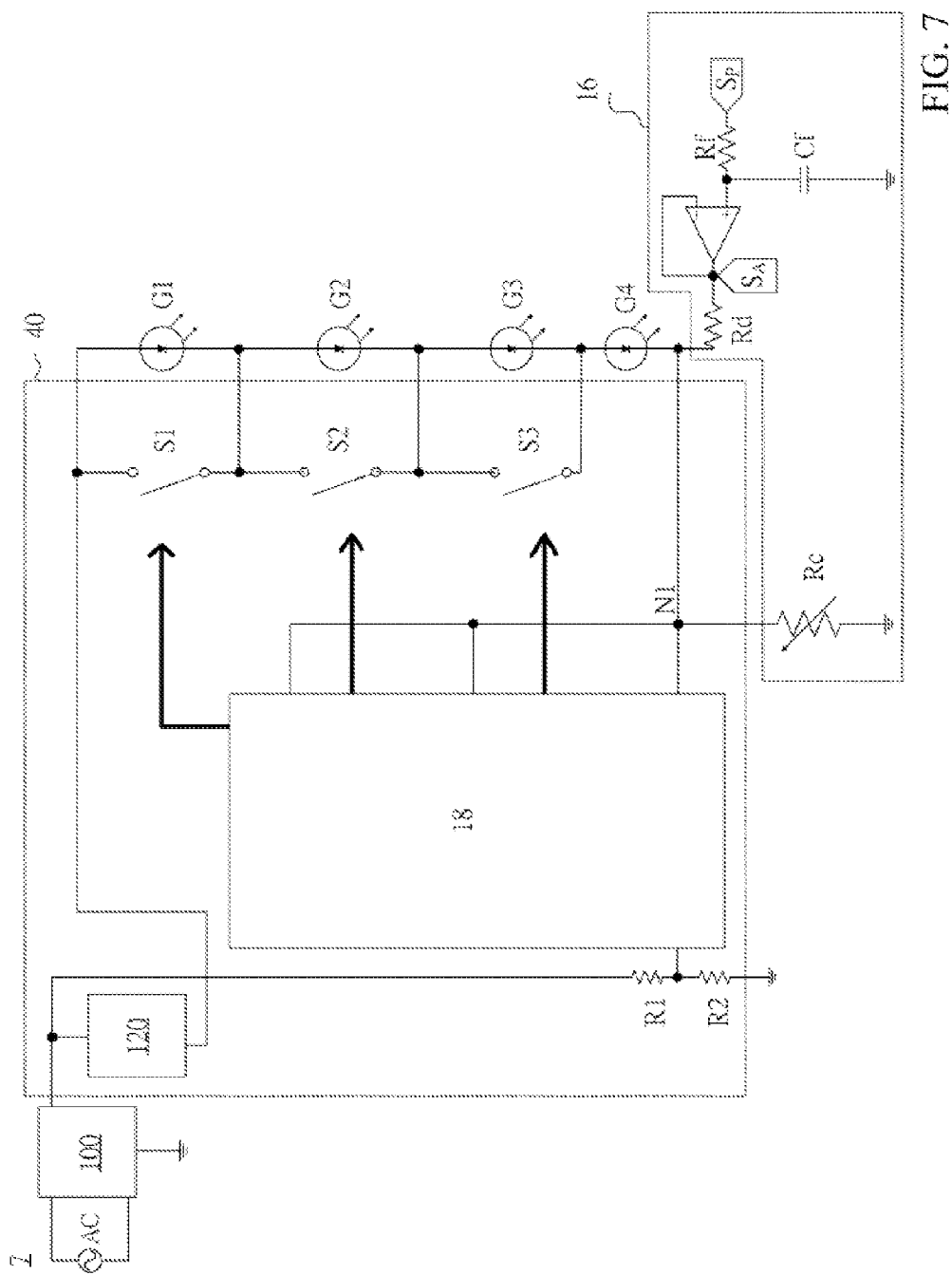
FIG. 7 illustrates a superordinate schematic diagram of all the disclosed illuminating apparatuses in collocation with PWM-, analog-, and rheostat-dimming schemes on the basis of a shared current sense and modulation unit 16 in the present invention.

FIG. 7 illustrates a superordinate schematic diagram of all the disclosed illuminating apparatuses in collocation with PWM-, analog-, and rheostat-dimming schemes in accordance with preferred embodiments of the present invention. To simplify the description, the voltage divider comprising resistors R1 and R2 in series would again be overlooked and an LED light engine 10 employing a bank of voltage dividers would simultaneously be assumed.

When it comes to the PWM-dimming scheme, the shared current sense and modulation unit 16 would consist of a fixed resistor Rc (providing a current sense signal for switch controllers), a fixed resistor Rd (superimposing a scaled-down analog-dimming signal on the current sense signal), a voltage buffer (preventing the extracted analog-dimming signal against loading effect), and an RC low-pass filter (extracting the average voltage from the inputted PWM-dimming signal). Equating the PWM-dimmed, scaled-down current sense signals and the reference voltage $V_{REF}$ would lead to the following equations:

$$\begin{cases} \left[I1 \times (Rc // Rd) + \dfrac{V_{AVE} \times Rc}{Rd + Rc}\right] \times \dfrac{r10}{r8 + r10} = V_{REF} \\ \left[I2 \times (Rc // Rd) + \dfrac{V_{AVE} \times Rc}{Rd + Rc}\right] \times \dfrac{r6}{r4 + r6} = V_{REF} \Rightarrow \\ \left[I3 \times (Rc // Rd) + \dfrac{V_{AVE} \times Rc}{Rd + Rc}\right] \times \dfrac{r2}{r0 + r2} = V_{REF} \end{cases}$$

$$\begin{cases} I1 = \dfrac{1}{Rc // Rd} \times \left[\left(1 + \dfrac{r8}{r10}\right) \times V_{REF} - \dfrac{V_{AVE} \times Rc}{Rd + Rc}\right] \\ I2 = \dfrac{1}{Rc // Rd} \times \left[\left(1 + \dfrac{r4}{r6}\right) \times V_{REF} - \dfrac{V_{AVE} \times Rc}{Rd + Rc}\right] \\ I3 = \dfrac{1}{Rc // Rd} \times \left[\left(1 + \dfrac{r0}{r2}\right) \times V_{REF} - \dfrac{V_{AVE} \times Rc}{Rd + Rc}\right] \end{cases},$$

where $V_{AVE}$ is the extracted average voltage of the inputted PWM-dimming signal in proportion to the PWM duty ratio. By adjusting the PWM duty ratio, the average current flowing through the extrinsic LED sub-arrays G1, G2, G3, and G4 to emit light could correspondingly be modulated because all the current levels I1, I2, and I3 would decrease with an increased average voltage $V_{AVE}$, so the resulting light apparatus would be PWM-dimmable.

When it comes to the analog-dimming scheme, the shared current sense and modulation unit 16 would retain the fixed resistor Rc and the fixed resistor Rd. The voltage buffer and the RC low-pass filter, both becoming unnecessary, could be removed. Equating the analog-dimmed, scaled-down current sense signals and the reference voltage $V_{REF}$ would lead to the following equations:

$$\begin{cases} \left[I1 \times (Rc // Rd) + \dfrac{V_{ANALOG} \times Rc}{Rd + Rc}\right] \times \dfrac{r10}{r8 + r10} = V_{REF} \\ \left[I2 \times (Rc // Rd) + \dfrac{V_{ANALOG} \times Rc}{Rd + Rc}\right] \times \dfrac{r6}{r4 + r6} = V_{REF} \Rightarrow \\ \left[I3 \times (Rc // Rd) + \dfrac{V_{ANALOG} \times Rc}{Rd + Rc}\right] \times \dfrac{r2}{r0 + r2} = V_{REF} \end{cases}$$

-continued $$\begin{cases} I1 = \frac{1}{Rc \,//\, Rd} \times \left[\left(1 + \frac{r8}{r10}\right) \times V_{REF} - \frac{V_{ANALOG} \times Rc}{Rd + Rc}\right] \\ I2 = \frac{1}{Rc \,//\, Rd} \times \left[\left(1 + \frac{r4}{r6}\right) \times V_{REF} - \frac{V_{ANALOG} \times Rc}{Rd + Rc}\right] \\ I3 = \frac{1}{Rc \,//\, Rd} \times \left[\left(1 + \frac{r0}{r2}\right) \times V_{REF} - \frac{V_{ANALOG} \times Rc}{Rd + Rc}\right] \end{cases},$$

where $V_{ANALOG}$ is the inputted analog-dimming signal level. By adjusting the analog-dimming signal level, the average current flowing through the extrinsic LED sub-arrays G1, G2, G3, and G4 to emit light could correspondingly be modulated because all the current levels I1, I2, and I3 would decrease with an increased analog-dimming signal level $V_{ANALOG}$, so the resulting light apparatus would be analog-dimmable.

When it comes to the rheostat-dimming scheme, the shared current sense and modulation unit 16 would merely take on a rheostat Rc. The fixed resistor Rd, the voltage buffer, and the RC low-pass filter, having nothing to do, could all be removed. Equating the rheostat-dimmed, scaled-down current sense signals and the reference voltage $V_{REF}$ would lead to the following equations:

$$\begin{cases} (I1 \times Rc)) \times \frac{r10}{r8 + r10} = V_{REF} \\ (I2 \times Rc)) \times \frac{r6}{r4 + r6} = V_{REF} \\ (I3 \times Rc)) \times \frac{r2}{r0 + r2} = V_{REF} \end{cases} \Rightarrow \begin{cases} I1 = \frac{1}{Rc} \times \left(1 + \frac{r8}{r10}\right) \times V_{REF} \\ I2 = \frac{1}{Rc} \times \left(1 + \frac{r4}{r6}\right) \times V_{REF} \\ I3 = \frac{1}{Rc} \times \left(1 + \frac{r0}{r2}\right) \times V_{REF} \end{cases},$$

where R16 is the variable resistance. By adjusting the variable resistance Rc, the average current flowing through the extrinsic LED sub-arrays G1, G2, G3, and G4 to emit light could correspondingly be modulated because all the current levels I1, I2, and I3 would decrease with an increased variable resistance Rc, so the resulting light apparatus would be rheostat-dimmable. Not only can the aforementioned variable resistance come from a single rheostat acting as the one and only variable resistor in a narrow sense, but it can also result from a series, a parallel, or a mixed combination of a number of current-sensing resistors under the control of a bank of electronic or mechanic switches in a broad sense.

To sum up, all the preferred embodiments of the present invention could gear up and down the number and current of excited LED sub-arrays according to the voltage level of the rectified sinusoidal input voltage for obtaining a high PF and a low THD. If further equipped with the option of disclosed flicker-suppressing capacitors, the disclosed AC-powered LED light engines could improve the flicker phenomenon while maintaining exactly the same high PF and exactly the same low THD without any deterioration. In addition to being TRIAC-dimmable via legacy phase-cut dimmers, the disclosed AC-powered LED light engines are also PWM-, analog-, and rheostat-dimmable, broadening the scope of dimming applications.

While the present invention is susceptible to various modifications and alternative forms, specific examples thereof have been shown in the drawings and are herein described in detail. It should be understood, however, that the present invention should not be limited to the disclosed particular forms, but to the contrary, should cover all modifications, equivalents, and alternatives falling within the spirit and scope of the appended claims.

The invention claimed is:

1. An AC-powered LED light engine, coupled between a rectifier and a plurality of extrinsic LED sub-arrays, comprising:
   a plurality of normally closed bypass switches, each connected in parallel with a corresponding LED sub-array except for a topmost or a bottommost LED sub-array and shuttling between three switch states: ON, REGULATION, and OFF;
   a normally closed current regulator coupled to the normally closed bypass switches and the extrinsic LED sub-arrays, and used to regulate a highest LED current level near a peak of an extrinsic mains voltage;
   a plurality of switch controllers, each of the switch controllers having a first terminal, a second terminal and a third terminal; and
   a shared current sense and modulation unit connected to the first terminals of the switch controllers through a plurality of corresponding resistors, and wherein the first terminal and second terminal of each of the switch controllers compare a scaled-down current sense signal and an original reference voltage, or compare an original current sense signal and a scaled-up reference voltage, when the scaled-down current sense signal is below the original current sense signal, or the original current sense signal is below the scaled-up reference voltage, each of the switch controller turns a corresponding normally closed bypass switch on via the third terminal, when the scaled-down current sense signal is at the original current sense signal, or the original current sense signal is at the scaled-up reference voltage, each of the switch controller turns the corresponding normally closed bypass switch on and off via the third terminal, when the scaled-down current sense signal is above the original current sense signal, or the original current sense signal is above the scaled-up reference voltage, each of the switch controller turns the corresponding normally closed bypass switch off via the third terminal, wherein the first terminals are connected together through the corresponding resistors respectively, the original current sense signal is provided by the shared current sense and modulation unit, the scaled-down current sense signal is obtained from the original current sense signal divided by the corresponding resistors, the original reference voltage is a reference voltage of each of the switch controller, and the scaled-up reference voltage is a superimposed of the reference voltages.

2. The AC-powered LED light engine according to claim 1, wherein the second terminals of the switch controllers are connected together, and wherein the corresponding resistors respectively connected between the shared current sense and modulation unit and the first terminal of the switch controllers are a part of a plurality of voltage-dividing resistor pairs.

3. The AC-powered LED light engine according to claim 2, wherein another part of the voltage-dividing resistor pairs are respectively connected between the first terminals of the switch controllers and ground, or are respectively connected between the first terminals of the switch controllers and the second terminals of the switch controllers, the scaled-down current sense signals are obtained from the originals current sense signals divided by the voltage-dividing resistor pairs.

4. The AC-powered LED light engine according to claim 2, wherein the voltage-dividing resistor pairs comprise at least a first voltage-dividing resistor pair to scale down the original current sense signal into a first scaled-down current sense signal, and a second voltage-dividing resistor pair to scale down the original current sense signal into a second scaled-down current sense signal, and wherein the first scaled-down current sense signal is larger than the second scaled-down current sense signal, and wherein the switch controllers are BJTs or shunt regulators and comprise a first switch controller, and a second switch controller, the first switch controller compares the first scaled-down current sense signal and the original reference voltage, and the second switch controller compares the second scaled-down current sense signal and the original reference voltage.

5. The AC-powered LED light engine according to claim 1, wherein the corresponding resistors connected between the shared current sense and modulation unit and the first terminal of the switch controllers are anti-clamping resistors, and wherein a second terminal of a current switch controller is connected to a first terminal of a downstream switch controller, and a first terminal of a current switch controller is connected to a second terminal of an upstream switch controller.

6. The AC-powered LED light engine according to claim 5, wherein the switch controllers are BJTs or shunt regulators having the original reverence voltage, the downstream switch controller compares the original current sense signal and the original reference voltage, the current switch controller compares the original current sense signal and substantially twice the magnitude of the original reference voltage.

7. The AC-powered LED light engine according to claim 5, wherein the second terminal of the current switch controller is connected to the first terminal of the downstream switch controller through a Zener diode, wherein the switch controllers are BJTs or shunt regulators having the original reverence voltage, the downstream switch controller compares the original current sense signal and the original reference voltage, the current switch controller compares the original current sense signal and twice the magnitude of the original reference voltage and a breakdown voltage of the Zener diode as a whole.

8. The AC-powered LED light engine according to claim 1, wherein the normally closed current regulator is a controlled current-regulating switch or an uncontrolled current regulator, the normally closed bypass switches are enhancement-mode n-channel MOSFET or depletion-mode n-channel MOSFET, and wherein the controlled current-regulating switch is a MOSFET regulated by a corresponding one of the switch controllers, and the uncontrolled current regulator comprises another MOSFET, a current sensing resistor and a BJT or a shunt regulator.

9. The AC-powered LED light engine according to claim 1, wherein each of the normally closed bypass switches is depletion-mode or enhancement-mode n-channel MOSFET, and the switch controllers are BJT-based gate-driving circuits, comprise a plurality of gate-discharging resistors or corresponding plurality of gate-charging resistors, and a plurality of corresponding voltage-comparing BJTs or shunt regulators.

10. The AC-powered LED light engine according to claim 9, wherein the corresponding voltage-comparing BJTs or shunt regulators are disposed one on top of another in the middle, so that a current one of the corresponding voltage-comparing BJTs or shunt regulators has a first reference voltage, an upstream one of the corresponding voltage-comparing BJTs or shunt regulators has a second reference voltage, and a downstream one of the corresponding voltage-comparing BJTs or shunt regulators has a third reference voltage, and the second reference voltage is larger than the first reference voltage, and the first reference voltage is larger than the third reference voltage.

11. The AC-powered LED light engine according to claim 10, wherein the second reference voltage is substantially twice as much as the first reference voltage, and the first reference voltage is substantially twice as much as the third reference voltage.

12. The AC-powered LED light engine according to claim 9, wherein the corresponding voltage-comparing BJTs or shunt regulators are disposed one on top of another in the middle through Zener diodes.

13. The AC-powered LED light engine according to claim 1, further comprising a voltage divider coupled to the rectifier to provide a scaled-down sample of a rectified sinusoidal input voltage so that the current sense signal is compared with a sinusoidal-modulated reference voltage, wherein the voltage divider comprises a first resistors and a second resistor connected in series.

14. The AC-powered LED light engine according to claim 1, wherein the shared current sense and modulation unit comprises a fixed resistor, another fixed resistor having one end connected to a high-side terminal of the fixed resistor, a voltage buffer having an output terminal connected to another end of the another fixed resistor, and an RC low-pass filter connected to an input terminal of the voltage buffer, and a PWM signal is provided to the RC low-pass filter.

15. The AC-powered LED light engine according to claim 1, wherein the shared current sense and modulation unit is a rheostat.

16. The AC-powered LED light engine according to claim 1, wherein the shared current sense and modulation unit comprises a fixed resistor, and another fixed resistor, the another fixed resistor having one end connected to a high-side terminal of the fixed resistor, and an analog signal is provided to another end of the another fixed resistor.

17. The AC-powered LED light engine according to claim 1, further comprising:
a plurality of flicker-suppressing capacitors, each coupled in parallel with the corresponding LED sub-array and functioning as an auxiliary supply of LED current; and
a plurality of charge-retaining diodes, each coupled between the corresponding normally closed bypass switch and one of the corresponding flicker-suppressing capacitors to prevent a capacitor charge from being consumed by an unintended circuit components instead of the corresponding LED sub-array.

18. An integrated circuit for an illuminating apparatus, comprising the AC-powered LED light engine according to claim 1.

19. The integrated circuit for an illuminating apparatus according to claim 18, wherein the integrated circuit has a plurality of pins for externally connection to the extrinsic LED sub-arrays and the shared current sense and modulation unit.

20. An illuminating apparatus, comprising:
a rectifier coupled to an AC mains for providing a rectified voltage; and
the AC-powered LED light engine according to claim 1, coupled between the rectifier and a plurality of extrinsic LED sub-arrays.

* * * * *